United States Patent
Kim et al.

(10) Patent No.: US 10,386,555 B2
(45) Date of Patent: Aug. 20, 2019

(54) OPTICAL FILTER, AND IMAGING DEVICE COMPRISING SAME

(71) Applicant: LMS Co., Ltd., Pyeongtaek-si (KR)

(72) Inventors: Joo Young Kim, Suwon-si (KR); Sung Min Cho, Seongnam-si (KR)

(73) Assignee: LMS CO., LTD., Pyeongtaek-si, Gyeonggi (KR)

( * ) Notice: Subject to any disclaimer, the term of this patent is extended or adjusted under 35 U.S.C. 154(b) by 0 days.

(21) Appl. No.: 14/917,016

(22) PCT Filed: Aug. 30, 2014

(86) PCT No.: PCT/KR2014/008074
§ 371 (c)(1),
(2) Date: May 10, 2016

(87) PCT Pub. No.: WO2015/034211
PCT Pub. Date: Mar. 12, 2015

(65) Prior Publication Data
US 2016/0252664 A1    Sep. 1, 2016

(30) Foreign Application Priority Data

Sep. 6, 2013   (KR) .................. 10-2013-0107119
Nov. 18, 2013  (KR) .................. 10-2013-0140098

(51) Int. Cl.
*G02B 5/28* (2006.01)
*G02B 5/20* (2006.01)
*G02B 5/22* (2006.01)

(52) U.S. Cl.
CPC ............. *G02B 5/282* (2013.01); *G02B 5/208* (2013.01); *G02B 5/223* (2013.01)

(58) Field of Classification Search
CPC .......... G02B 5/282; G02B 5/28; G02B 5/223; G02B 5/22; G02B 5/20; G02B 5/208
(Continued)

(56) References Cited

U.S. PATENT DOCUMENTS

| | | | |
|---|---|---|---|
| 2010/0321770 A1* | 12/2010 | Pyo | G02B 5/208 359/359 |
| 2012/0145901 A1* | 6/2012 | Kakiuchi | G02B 5/208 250/330 |
| 2016/0259103 A1 | 9/2016 | Kim et al. | |

FOREIGN PATENT DOCUMENTS

| | | |
|---|---|---|
| CN | 101750654 A | 6/2010 |
| JP | 2006-085196 | 3/2006 |

(Continued)

OTHER PUBLICATIONS

International Search Report and the Written Opinion dated Dec. 16, 2014 From the Korean Intellectual Property Office Re. Application No. PCT/KR2014/008109 and Its Translation of Search Report in English.

(Continued)

*Primary Examiner* — Stephone B Allen
*Assistant Examiner* — Rahman Abdur
(74) *Attorney, Agent, or Firm* — Polsinelli PC

(57) ABSTRACT

An optical filter satisfying Mathematical Formula 1 and an imaging device comprising the filter are provided.

$$\Delta E^* \leq 1.5.\qquad\text{[Mathematical Formula 1]}$$

In Mathematical Formula 1, $\Delta E^*$ represents a color difference between light that has entered in the vertical direction of the optical filter and passed through the optical filter, and light that has entered in the direction at an angle of 30° to the vertical direction of the optical filter and passed through the optical filter.

9 Claims, 1 Drawing Sheet

(58) Field of Classification Search
USPC .................................................. 359/260, 359
See application file for complete search history.

(56) References Cited

FOREIGN PATENT DOCUMENTS

| | | | |
|---|---|---|---|
| JP | 2006-106570 | | 4/2006 |
| JP | 2006-184892 | | 7/2006 |
| JP | 2008-106836 | | 5/2008 |
| JP | 2011-100084 | | 5/2011 |
| JP | 2011100084 A | * | 5/2011 |
| JP | 2012-008532 | | 1/2012 |
| JP | 2012-185468 | | 9/2012 |
| JP | 2013-050593 | | 3/2013 |
| KR | 10-2010-0137229 | | 12/2010 |
| WO | WO 2015/034211 | | 3/2015 |
| WO | WO 2015/034217 | | 3/2015 |

OTHER PUBLICATIONS

International Search Report and the Written Opinion dated Dec. 17, 2014 From the Korean Intellectual Property Office Re. Application No. PCT/KR2014/008074 and Its Translation of Search Report in English.
Translation of Third Party Observation and Additional Comments Dated Dec. 14, 2015 From the Korean Intellectual Property Office Re. Application No. PCT/KR2014/008074.
Translation of Third Party Observation and Additional Comments Dated Dec. 28, 2015 From the Korean Intellectual Property Office Re. Application No. PCT/KR2014/008074.
Office Action dated May 4, 2017 against the corresponding Chinese Patent Application No. 201480049126.6.

* cited by examiner

OPTICAL FILTER, AND IMAGING DEVICE COMPRISING SAME

RELATED APPLICATIONS

This application is a National Phase of PCT Patent Application No. PCT/KR2014/008074 having International filing date of Aug. 30, 2014, which claims the benefit of priority of Korean Patent Applications Nos. 10-2013-0107119 filed on Sep. 6, 2013 and 10-2013-0140098 filed on Nov. 18, 2013. The contents of the above applications are all incorporated by reference as if fully set forth herein in their entirety.

FIELD AND BACKGROUND OF THE INVENTION

Field of the Invention

The present invention relates to an optical filter and an imaging device including the same.

Background Art

Imaging devices such as cameras use a CMOS sensor to convert incident light into electronic signals, thereby forming images. To realize high-quality images with the high pixel counts of the cameras, a newly developed back side illuminated-type (BSI-type) CMOS sensor has been applied to main cameras instead of a front side illuminated-type (FSI-type) CMOS sensor. The FSI-type CMOS sensor has an effect of blocking out some of the light since wirings are formed on a top surface of a photodiode (PD). On the other hand, the BSI-type CMOS sensor may receive a larger amount of incident light compared to the FSI-type CMOS sensor since the wirings are disposed under the photodiode to receive a larger amount of light, and thus has an effect of increasing the intensity of an image by 70% or more. Therefore, the BSI-type CMOS sensors are generally applied in most cameras with over eight million pixels.

Such a BSI-type CMOS sensor has a structure in which light having a larger angle of incidence can reach the photodiode, compared to that in the FSI-type CMOS sensor.

In general, the CMOS sensor may also detect light in a wavelength region which cannot be seen by the naked eye. Since an image is distorted by the light in such a wavelength region, colors different from those viewed by the naked eye are observed. To solve this problem, an optical filter is used in the front of the CMOS sensor. However, the conventional optical filter has a problem in that the transmission spectrum of the optical filter varies as the angle of incidence of light varies, thereby resulting in distorted images.

PRIOR-ART DOCUMENT (Patent Document 1) Japanese Patent Laid-open Publication No. 2008-106836

SUMMARY OF THE INVENTION

Technical Problem

Therefore, the present invention is directed to providing an optical filter capable of reducing a color difference due to an angle of incidence of light to enhance color reproduction characteristics.

Also, the present invention is directed to providing an imaging device including the optical filter.

Technical Solution

To solve the above problem, one aspect of the present invention provides an optical filter which satisfies the following Mathematical Formula 1.

$$\Delta E^* \leq 1.5 \quad \text{[Mathematical Formula 1]}$$

In Mathematical Formula 1, $\Delta E^*$ represents a color difference between light that is incident on the optical filter in the vertical direction and passes through the optical filter, and light that is incident at an angle of 30° with respect to the vertical direction of the optical filter and passes through the optical filter.

Another aspect of the present invention may provide an imaging device including the optical filter according to one exemplary embodiment of the present invention.

Effect of the Invention

Such an optical filter can be useful in preventing a shift in a transmission spectrum according to a change in the angle of incidence of light without hindering the transmittance in the visible region.

DESCRIPTION OF SPECIFIC EMBODIMENTS OF THE INVENTION

Figure 1:
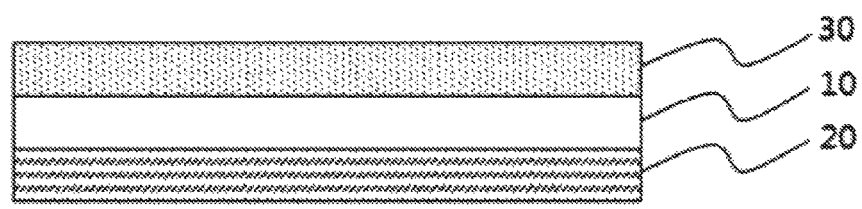
FIG. 1 is a cross-sectional view showing a stacked structure of an optical filter according to one exemplary embodiment of the present invention.

Hereinafter, the term "angle of incidence" used in the present invention refers to an angle of light incident on an optical filter with respect to a direction perpendicular to the optical filter. A required quantity of incident light may increase as the number of pixels in an imaging device increases. Therefore, the latest imaging devices need to receive light incident on the optical filter in the vertical direction as well as light incident at an angle of 30° or more with respect to the vertical direction.

Meanwhile, in the present invention, the term "$\Delta E^*$" refers to a color difference between light that is incident on an optical filter in the vertical direction and passes through the optical filter and light that is incident on the optical filter at an angle of 30° with respect to the vertical direction of the optical filter and passes through the optical filter.

In general, the light passing through the optical filter may be divided into a component substantially parallel with the incident light and a scattering component. In this case, a transmittance of the component of the light substantially parallel with the incident light is referred to as a direct transmittance, and a transmittance of the scattering component of the light is referred to as a diffuse transmittance. Generally, the transmittance of light is a concept encompassing the direct transmittance and the diffuse transmittance. In the present invention, however, the transmittance of light is used only to denote the direct transmittance.

Specifically, the $\Delta E^*$ is a concept used in a Commission International de l'Eclairage (CIE) Lab color space and is a color value specified by the CIE. Such a concept is utilized in the present invention. The CIE Lab color space is a color coordinate space in which a difference in color that can be sensed by human eyesight may be expressed. A distance between two colors in the CIE Lab color space is designed to be in proportion to a difference between two colors recognized by humans.

The term "color difference" in the CIE Lab color space refers to a distance between two colors in the CIE Lab color space. That is, a longer distance means that there is a greater color difference, and a shorter distance means that there is smaller color difference. Such a color difference may be indicated by $\Delta E^*$.

Any position in the CIE color space may be represented by three $L^*$, $a^*$ and $b^*$ coordinate values. The $L^*$ value represents a brightness. In this case, $L^*$ represents black when $L^*$ is 0 and represent white when $L^*$ is 100. The $a^*$ value represents to which of the two colors, pure magenta and pure green, a color having the corresponding color coordinates is closer. The $b^*$ value represents to which of the two color, pure yellow and pure blue, a color having the corresponding color coordinates is closer.

The $a^*$ value is in a range of $-a$ to $+a$. The maximum value ($a^*$ max) of $a^*$ represents pure magenta, and the minimum value ($a^*$ min) of $a^*$ represents pure green. For example, the $a^*$ value represents a color closer to pure green when $a^*$ is a negative number and represents a color closer to pure magenta when $a^*$ is a positive number. When $a^*=80$ is compared to $a^*=50$, the $a^*$ value means that the color is closer to pure magenta when $a^*$ is 80 compared to when $a^*$ is 50.

The $b^*$ value is in a range of $-b$ to $+b$. The maximum value ($b^*$ max) of $b^*$ represents pure yellow, and the minimum value ($b^*$ min) of $b^*$ represents pure blue. For example, the $b^*$ value represents a color closer to pure yellow when $b^*$ is a negative number and represents a color closer to pure blue when $b^*$ is a positive number. When $b^*=50$ is compared to $b^*=20$, the $b^*$ value means that the color is closer to pure yellow when $b^*$ is 80 compared to when $b^*$ is 50.

Typically, the color difference is hardly recognized by human eyesight when the $\Delta E^*$ is less than or equal to 1.5, and the color difference may not be recognized at all by human eyesight when the $\Delta E^*$ is less than or equal to 0.5. However, the color difference may be recognized by human eyesight when the $\Delta E^*$ is greater than 1.5, and the color difference may be clearly recognized by human eyesight when the $\Delta E^*$ is greater than or equal to 2.0. For example, when products are produced in a factory, maintaining the $\Delta E^*$ value in a range of 0.8 to 1.2 means that a deviation of color between the products is managed to an extent such that the deviation of color cannot be recognized by human eyesight. The color difference $\Delta E^*$ between any color E1 having color coordinates of (L1*, a1*, b1*) and another color E2 having color coordinates of (L2*, a2*, b2*) may be calculated by the following Mathematical Formula 5.

$$\Delta E^* = \sqrt{(\Delta L^*)^2 + (\Delta a^*)^2 + (\Delta b^*)^2}$$ [Mathematical Formula 5]

In Mathematical Formula 5, $\Delta L^*$ represents a difference between L1* and L2* of the color coordinates of the two colors E1 and E2. Also, the $\Delta a^*$ represents a difference between a1* and a2* of the color coordinates of the colors E1 and E2, and the $\Delta b^*$ represents a difference between b1* and b2* of the color coordinates of the colors E1 and E2.

The present invention is directed to an optical filter. According to one exemplary embodiment, the imaging device may include the optical filter characterized by the optical filter satisfying the following Mathematical Formula 1.

$$\Delta E^* \leq 1.5$$ [Mathematical Formula 1]

In Mathematical Formula 1, $\Delta E^*$ represents a color difference between light that is incident on the optical filter in the vertical direction and passes through the optical filter and light that is incident at an angle of 30° with respect to the vertical direction of the optical filter and passes through the optical filter.

Specifically, the $\Delta E^*$ in Mathematical Formula 1 represents a color difference calculated by applying to the Mathematical Formula 1 the color coordinates E1 (L1*, a1*, b1*) of light which is incident in the vertical direction on the optical filter according to one exemplary embodiment of the present invention and passes through the optical filter and the color coordinates E2 (L2*, a2*, b2*) of light which is incident at an angle of 30° with respect to the vertical direction of the optical filter and passes through the optical filter.

As described above, when an optical filter is realized so that the color difference ($\Delta E^*$) is less than or equal to 1.5, a distortion of colors present in an image expressed on a display device becomes unrecognizable by human eyesight.

For example, the $\Delta E^*$ may be in a range of 0.001 to 1.5, 0.001 to 1.2, 0.001 to 1.0, or 0.001 to 0.8.

According to another exemplary embodiment, the optical filter according to one exemplary embodiment of the present invention may include a light absorption layer and a near-infrared reflection layer and may satisfy the following Mathematical Formula 2.

$$W2 - W1 \leq 20 \text{ nm}$$ [Mathematical Formula 2]

In Mathematical Formula 2, W1 represents a wavelength at which the near-infrared reflection layer has a transmittance of 50% with respect to the light incident on the optical filter in the vertical direction in a wavelength range of 600 to 800 nm, and W2 represents a wavelength at which the light absorption layer has an absorption maximum.

Specifically, referring to Mathematical Formula 2, a difference between a wavelength W1 at which the near-infrared reflection layer has a transmittance of 50% with respect to the light incident on the optical filter in the vertical direction in a wavelength range of 600 to 800 nm and a wavelength at which the light absorption layer has an absorption maximum, that is, a wavelength W2 at which the light absorption layer has the lowest transmittance, may be less than or equal to 20 nm. For example, the W2-W1 value may be in a range of 0 nm to 20 nm, 5 nm to 15 nm, or 10 nm to 13 nm. When the W2-W1 value falls within this range, a shift in a transmission spectrum according to a change in angle of incidence may be prevented, and a superior near-infrared blocking effect may be expected. Also, since the near-infrared reflection layer reflects some of the light incident on the light absorption layer, problems which may be caused when the light absorption layer absorbs an excessive amount of light, for example, a decline in efficiency of the optical filter or a degradation of the optical filter, may be prevented.

According to still another exemplary embodiment, the optical filter according to one exemplary embodiment of the present invention may include a light absorption layer and a near-infrared reflection layer and may satisfy the following Mathematical Formula 3.

$$0 \text{ nm} \leq W1 - (W2 - W3/2) \leq 65 \text{ nm}$$ [Mathematical Formula 3]

In Mathematical Formula 3, W1 represents a wavelength at which the near-infrared reflection layer has a transmittance of 50% to light incident on the optical filter in the vertical direction in a wavelength range of 600 to 800 nm, W2 represents a wavelength at which the light absorption layer has an absorption maximum, and W3 represents an absolute value of a difference between two wavelength values at which the light absorption layer has a transmittance of 50% in a wavelength range of 600 nm or more.

Specifically, Mathematical Formula 3 shows a relationship among a wavelength W1 at which the near-infrared reflection layer has a light transmittance of 50% with respect to light incident on the optical filter in the vertical direction in a wavelength range of 600 to 800 nm, a wavelength W2 at which the light absorption layer has an absorption maximum, and a full width at half maximum (FWHM) W3 at which the light absorption layer has a transmittance of 50%. For example, the W1−(W2−W3/2) value may be in a range of 0 nm to 65 nm, 5 nm to 40 nm, or 10 nm to 30 nm. Specifically, when the W1−(W2−W3/2) value is adjusted to be within this range, the transmittance of light in a near-infrared region may be minimized. In this case, when the W1−(W2−W3/2) value is less than 0 nm, a shift in a transmission spectrum of the optical filter according to a change in angle of incidence may not be prevented, and the transmittance of light in a near-infrared region may increase, thereby creating a problem where a distortion of colors present in an image expressed on a display device become recognizable by users.

On the other hand, when the W1−(W2−W3/2) value is greater than 65 nm, a stability of a formulation for the light absorption layer may be degraded, rather images may be distorted since the transmittance of light in the visible region contributing to production of images may be hindered. When Mathematical Formula 1 and Mathematical Formulas 2 and 3 are satisfied at the same time, an angle of incidence of light incident on the optical filter may be changed, but a distortion of an image due to a change in the angle of incidence may be minimized, making it possible to reproduce colors with the same fidelity of an image observed with the naked eye. Also, when the transmittance of light in a near-infrared region is minimized, a decline in the efficiency of the optical filter or a degradation of the optical filter, which may be caused when light in the near-infrared region is incident on the optical filter, may be prevented.

In a structure of such an optical filter, unnecessary transmission peaks may be generated in a wavelength range of a near-infrared region (700 to 750 nm) depending on the absorption characteristics of the light absorption layer.

The optical filter according to this embodiment may satisfy the following Mathematical Formula 4 to prevent generation of the unnecessary transmission peaks.

$$\% \ T_{NIR\text{-}peak} \leq 10\% \quad \text{[Mathematical Formula 4]}$$

In Mathematical Formula 4, % $T_{NIR\text{-}peak}$ represents a maximum transmittance in a wavelength range of a near-infrared region (700 to 750 nm).

Specifically, the % $T_{NIR\text{-}peak}$ represents a maximum transmittance in the wavelength range of the near-infrared region. Here, the % $T_{NIR\text{-}peak}$ may be less than or equal to 10%. For example, the % $T_{NIR\text{-}peak}$ may be in a range of 0.1% to 8%, 1% to 5%, or 1% to 2%, and preferably 0%. The distortion of an image may be reduced as the % $T_{NIR\text{-}peak}$ reaches 0%.

According to yet another exemplary embodiment, the optical filter according to one exemplary embodiment of the present invention may have an average transmittance of 80% or more in the visible region (450 to 600 nm).

When the optical filter is applied to an imaging device or a camera module, the optical filter may have a high light transmittance in the visible region. When the optical filter has an average transmittance of 80% or more in the visible region, images expresses by the imaging device or the camera module to which the optical filter is applied may be realized at the same fidelity of images observed with the naked eye.

According to still another exemplary embodiment, the optical filter according to one exemplary embodiment of the present invention may have an average transmittance of 10% or less in an infrared region (750 to 1,000 nm).

Specifically, the condition may means that the transmittance of the light by the optical filter in the infrared region is less than or equal to 10%. When the transmittance of the light by the optical filter in the infrared region is controlled to be within this range, a decrease in the dynamic range of the visible region, an increase in noise, and decreases in color reproduction characteristics and resolution may be prevented.

The dynamic range of the visible region refers to a range of light that can be actively expressed on a screen by a CMOS sensor. When light in an infrared region irrelevant to the color expression passes through the optical filter and is incident on the CMOS sensor, a dynamic range of the visible region required to realize colors may be reduced. When the dynamic range of the visible region is reduced, it becomes impossible to distinguish an image in a dark region, making it difficult to realize an accurate image. Therefore, the optical filter has to have a minimized light transmittance in the infrared region. In the CMOS sensor, noise is generally generated by a circuit structure. Particularly, thermal noise is mainly caused by the circuit structure. Since the light of the infrared region passing through the optical filter acts as a leading cause of heat generation in the CMOS sensor, the optical filter has to have a minimized light transmittance in an infrared region.

As high-pixel density imaging devices using a sensor having a high sensitivity such as the BSI-type CMOS sensor have been developed, the angle of incidence of light incident on the optical filter applied to the imaging device varies, causing a shift in a transmission spectrum of the optical filter. In this case, images provided by the high-pixel density imaging device may be severely distorted. To prevent such a severe distortion, an alternative to control a difference in wavelengths at which the light absorption layer has a transmittance of 50% of the light which is incident on the optical filter in the vertical direction and passes through the optical filter and light which is incident at an angle of 30° with respect to the vertical direction of the optical filter and passes through the optical filter was typically introduced in the art. However, there is a limit to preventing the distortion of images only by controlling the difference in the wavelengths at which the light absorption layer has a transmittance of 50% of the light incident in each of the angles. That is, the transmittance of the optical filter drastically varies at a wavelength at which the light absorption layer has a transmittance of 30% of the light incident in each of the angles when the angle of incidence of the light varies. As a result, the problem exists where the images are still distorted.

To solve the persistent problems described above, the wavelength at which the light absorption layer has a transmittance of 50% of the light incident in each of the angles and the wavelength at which the light absorption layer has a transmittance of 30% of the light incident in each of the angles as described in Mathematical Formulas 1 to 3 are controlled at the same time in the optical filter according to one exemplary embodiment of the present invention. As a result, when the difference in the wavelengths at which the light absorption layer has a transmittance of 30% of the light which is incident on the optical filter in the vertical direction and passes through the optical filter and the light which is incident at an angle of 30° of the vertical direction of the optical filter and passes through the optical filter is controlled within 15 nm or less, the optical filter according to one exemplary embodiment of the present invention may reduce a distortion of images compared to the conventional optical filters.

Hereinafter, a configuration of the optical filter according to one exemplary embodiment of the present invention will be described in further detail.

The optical filter according to one exemplary embodiment of the present invention may include a light absorption layer including at least one light absorbing agent and a near-infrared reflection layer. Therefore, most of the light of the near-infrared region incident on the optical filter is reflected by the near-infrared reflection layer.

The light absorption layer may include a binder resin, and a light absorbing agent dispersed in the binder resin. For example, the type of the binder are not particularly limited, and at least one selected from the group consisting of a cyclic olefin-based resin, a polyarylate resin, a polysulfone resin, a polyether sulfone resin, a poly(para-phenylene) resin, a polyarylene ether phosphine oxide resin, a polyimide resin, a polyetherimide resin, a polyamideimide resin, an acrylic resin, a polycarbonate resin, a polyethylene naphthalate resin, and various organic-inorganic hybrid resins may be used as the binder.

A least one selected from the group consisting of various types of dyes, pigments or metal complex compounds may be used as the light absorbing agent, but the present invention is not particularly limited thereto. For example, a cyanine-based compound, a phthalocyanine-based compound, a naphthalocyanine-based compound, or a dithiol metal complex compound may be used as the light absorbing agent.

The light absorbing agent may be used alone. In some cases, the light absorbing agents may be used in a combination of two or more or formed in two divided layers.

The content of the light absorbing agent may, for example, be in a range of 0.001 to 10 parts by weight, 0.01 to 10 parts by weight, or 0.5 to 5 parts by weight, based on 100 parts by weight of the binder resin. When the content of the light absorbing agent is controlled within this range, a shift in the transmission spectrum of the optical filter according to a change in the angle of incidence of light may be corrected, and an excellent near-infrared ray blocking effect may be achieved. Also, when the light absorbing agents are used in a combination of two or more, or formed in two divided layers, the full width at half maximum (FWHM) of the absorption spectrum of the light absorption layer may increase, thereby reducing the maximum transmittance in a wavelength range of the near-infrared region.

The optical filter according to one exemplary embodiment of the present invention may further include a transparent base formed on one surface of the light absorption layer. For example, the transparent base may be a transparent glass substrate or a transparent resin-based substrate.

Specifically, a transparent glass substrate may be used as the transparent base, and a phosphate-based glass substrate containing copper oxide (CuO) may be used when necessary. When the glass substrate is used as the transparent base, thermal deformation may be prevented and bending may be suppressed during the manufacture of the optical filter without hindering the transmittance of visible light.

The transparent resin-based substrate preferably has an excellent strength. For example, a light-transmitting resin in which inorganic filler is dispersed may be used. The type of the light-transmitting resin is not particularly limited, and the binder resins said to be applicable to the light absorption layer may be used herein. For example, types of the binder resin used in the light absorption layer and of the resin used in the transparent base may be controlled in the same or similar manner to reduce interfacial delamination.

The near-infrared reflection layer may be formed in a dielectric multilayer. The near-infrared reflection layer serves to reflect light of a near-infrared region. For example, a dielectric multilayer in which a high refractive index layer and a low refractive index layer are alternately stacked may be used as the near-infrared reflection layer. The near-infrared reflection layer may further include an aluminum deposition film, a noble metal thin film, or a resin film in which fine particles of at least one selected from the group consisting of indium oxide and tin oxide are dispersed when necessary.

By way of an example, the near-infrared reflection layer may have a structure in which a dielectric layer having a first refractive index and a dielectric layer having a second refractive index are alternately stacked. A difference in refractive index between the dielectric layer having a first refractive index and the dielectric layer having a second refractive index may be greater than or equal to 0.2, or 0.3, or in a range of 0.2 to 1.0.

For example, the dielectric layer having a first refractive index may be a layer having a relatively high refractive index, and the dielectric layer having a second refractive index may be a layer having a relatively low refractive index. In this case, the refractive index of the dielectric layer having a first refractive index may be in a range of 1.6 to 2.4, and the refractive index of the dielectric layer having a second refractive index may be in a range of 1.3 to 1.6.

The dielectric layer having a first refractive index may be formed of at least one selected from the group consisting of titanium oxide, alumina, zirconium oxide, tantalum pentoxide, niobium pentoxide, lanthanum oxide, yttrium oxide, zinc oxide, zinc sulfide, and indium oxide. The indium oxide may further include a small amount of titanium oxide, tin oxide, or cerium oxide, when necessary.

The dielectric layer having a second refractive index may be formed of at least one selected from the group consisting of silica, lanthanum fluoride, magnesium fluoride, and sodium fluoride alumina.

A method of forming the near-infrared reflection layer is not particularly limited, and the near-infrared reflection layer may, for example, be formed using a method such as CVD, sputtering, vacuum evaporation, etc.

The near-infrared reflection layer may have a structure in which the dielectric layer having a first refractive index and the dielectric layer having a second refractive index are alternately stacked 5 to 61 times, 11 to 51 times, or 21 to 41 times. The near-infrared reflection layer may be designed by taking into account a desired range of transmittance and refractive index as well as a region of wavelengths to be blocked.

The near-infrared reflection layer may further include a light absorbing agent dispersed in the dielectric multilayer. For example, the light absorbing agent dispersed in the dielectric multilayer may be used without particular limitation as long as the light absorbing agent may absorb a near-infrared (>600 nm) to infrared wavelength region. The light absorbing agent may be dispersed in the dielectric multilayer to reduce an alternate stacking number of the dielectric multilayers, thereby reducing a thickness of the near-infrared reflection layer. In this way, when the near-infrared reflection layer is applied to the imaging device, the imaging device may be made smaller.

The present invention may provide an imaging device including the optical filter according to one exemplary embodiment of the present invention. The optical filter according to one exemplary embodiment of the present invention is also applicable to display devices such as PDP, etc. However, the optical filter is more preferably applicable to imaging devices requiring a high pixel density, for example, cameras with over eight million pixels, etc. For example, the optical filter according to one exemplary embodiment of the present invention is effectively applicable to cameras for mobile devices.

EXAMPLES

Hereinafter, the optical filter having a novel structure according to one exemplary embodiment of the present invention will be described in detail with reference to specific embodiments of the present invention. However, it should be understood that the description proposed herein is just a preferable example for the purpose of illustrations only and not intended to limit or define the scope of the invention.

Preparative Example 1

$TiO_2$ and $SiO_2$ were alternately stacked on one surface of a glass substrate using an E-beam evaporator to form a near-infrared reflection layer.

Separately, a light absorbing agent which is commercially available and has an absorption maximum of 670 nm, a cyclic olefin-based resin as a binder resin source, and toluene (commercially available from Sigma Aldrich) were mixed and then stirred for at least a day using a magnetic stirrer to prepare a near-infrared absorbing solution.

Next, the prepared near-infrared absorbing solution was spin-coated onto an opposite surface of the glass substrate on which the near-infrared reflection layer was formed to form a light absorption layer.

The optical filter according to one exemplary embodiment of the present invention was manufactured using the above-described method. A stacked structure of the manufactured optical filter is shown in FIG. 1. Referring to FIG. 1, a near-infrared reflection layer 20 is formed on the bottom surface of a glass substrate 10, and a light absorption layer 30 is formed on the top surface of the glass substrate 10.

Figure 2:
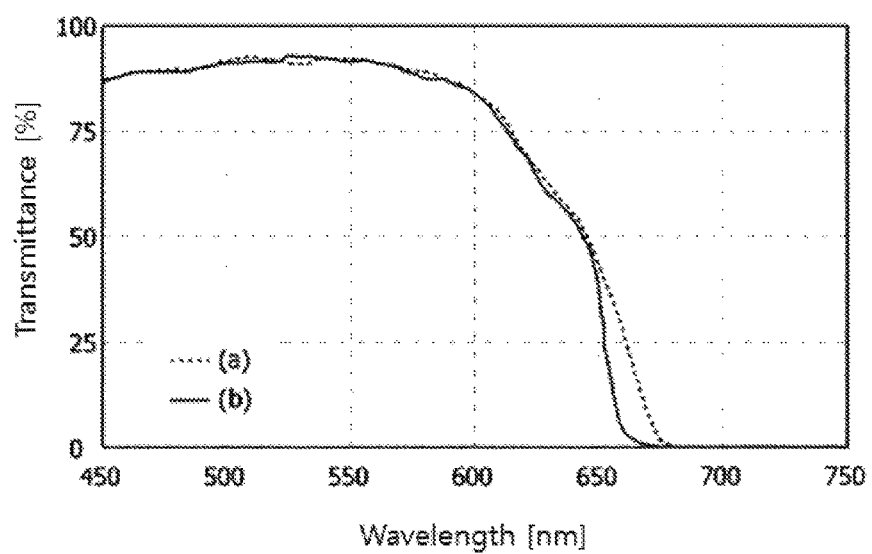
FIG. 2 is a graph illustrating the light transmittance spectra of the optical filter according to one exemplary embodiment of the present invention.

A light transmittance test was carried out on the optical filter manufactured in this Preparative Example 1 at different angles ((a) 0° and (b)$_{30}$°) of incidence of light. The results are shown in FIG. 2.

Preparative Example 2

An optical filter was manufactured in the same manner as in Preparative Example 1, except that a light absorbing agent which was commercially available and had an absorption maximum of 700 nm was used instead.

Experimental Example 1

The optical filters manufactured in Preparative Examples 1 and 2 were measured for ΔE*.

Specifically, the color coordinates L*, a* and b* of the light passing through each of the optical filters when white light was irradiated on the manufactured absorption filter in the vertical direction (an angle of incidence of 0°) and irradiated at an angle of 30° with respect to the vertical direction of the absorption filter were measured using spectrophotometer Lambda 35 commercially available from Perkin Elmer, and the ΔE* was then calculated.

Also, W1, W2 and W3 were measured to calculate a W2−W1 value and a W1−(W2−W3/2) value. The W2−W1 value as shown in Mathematical Formula 2, and the W1−(W2−W3/2) value as shown in Mathematical Formula 3 were measured.

In this case, the wavelength W1 at which the near-infrared reflection layer had a transmittance of 50% was controlled to be within 650 nm to 750 nm range by varying the alternate stacking number of $TiO_2$ and $SiO_2$ used to form the near-infrared reflection layer. The results are listed in the following Table 1.

TABLE 1

| W1 (nm) | Preparative Example 1 | | | Preparative Example 2 | | |
| --- | --- | --- | --- | --- | --- | --- |
| | ΔE* | W2 − W1 | W1 − (W2 − W3/2) | ΔE* | W2 − W1 | W1 − (W2 − W3/2) |
| 650 | 5.6 | 30 | 12 | 7.4 | 50 | −8 |
| 660 | 3.0 | 21 | 21 | 4.5 | 41 | 1 |
| 670 | 1.4 | 10 | 32 | 2.3 | 30 | 12 |
| 680 | 0.8 | 0 | 41 | 1.0 | 20 | 21 |
| 690 | 0.6 | −10 | 52 | 0.5 | 10 | 32 |
| 700 | 0.7 | −20 | 62 | 0.6 | 0 | 42 |
| 710 | 0.9 | −30 | 71 | 0.9 | −10 | 51 |
| 720 | 1.2 | −40 | 82 | 1.2 | −20 | 62 |
| 730 | 1.7 | −50 | 91 | 1.6 | −30 | 71 |
| 740 | 2.4 | −60 | 102 | 2.4 | −40 | 82 |
| 750 | 3.8 | −70 | 112 | 3.6 | −50 | 92 |

As listed in Table 1, it could be seen that the color difference (ΔE*) between light that was incident on the optical filter in the vertical direction and passed through the optical filter, and light that was incident at an angle of 30° with respect to the vertical direction of the optical filter and passed through the optical filter was less than or equal to 1.5 when the wavelength W1 at which the near-infrared reflection layer had a transmittance of 50% was in a range of 680 to 720 nm in the case of the optical filter according to one exemplary embodiment of the present invention. Also, it was revealed that the W2−W1 value was less than or equal to 20 nm when the wavelength W1 at which the near-infrared reflection layer had a transmittance of 50% was in a range of 670 to 750 nm in the case of the optical filter of Preparative Example 1, and when the wavelength W1 at which the near-infrared reflection layer had a transmittance of 50% was in a range of 680 to 750 nm in the case of the optical filter of Preparative Example 2. Further, it was revealed that the W1−(W2−W3/2) value was in a range of 0 nm to 65 nm when the wavelength W1 at which the near-infrared reflection layer had a transmittance of 50% was in a range of 650 to 700 nm in the case of the optical filter of Preparative Example 1, and when the wavelength W1 at which the near-infrared reflection layer had a transmittance of 50% was in a range of 660 to 720 nm in the case of the optical filter of Preparative Example 2.

Experimental Example 2

The optical filters manufactured in Preparative Examples 1 and 2 were measured for W1−(W2−W3/2) and maximum transmittance (% $T_{NIR-peak}$) in a wavelength range of a near-infrared region (700 to 750 nm).

In this case, the wavelength at which the near-infrared reflection layer had a transmittance of 50% was controlled to be within 650 nm to 750 nm range by varying the alternate stacking number of $TiO_2$ and $SiO_2$ used to form the near-infrared reflection layer. Also, the optical filters were measured by varying the thickness of the light absorption layer to 7, 11 and 15 μm. The results are listed in the following Tables 2 to 4.

(2-1) Formation of an Absorption Layer Having a Thickness of 7 μm (W3=57 nm)

TABLE 2

|  | Preparative Example 1 | | Preparative Example 6 | |
| --- | --- | --- | --- | --- |
| W1 (nm) | W1 − (W2 − W3/2) | (% $T_{NIR\text{-}peak}$) | W1 − (W2 − W3/2) | (% $T_{NIR\text{-}peak}$) |
| 650 | −2 | 1% | −22 | 0% |
| 660 | 8 | 1% | −12 | 0% |
| 670 | 19 | 1% | −1 | 1% |
| 680 | 28 | 1% | 8 | 0% |
| 690 | 39 | 5% | 19 | 1% |
| 700 | 49 | 21% | 29 | 2% |
| 710 | 58 | 50% | 38 | 5% |
| 720 | 69 | 76% | 49 | 21% |
| 730 | 78 | 87% | 58 | 49% |
| 740 | 89 | 92% | 69 | 76% |
| 750 | 98 | 95% | 78 | 87% |

Referring to Table 2, it was revealed that the optical filter of Preparative Example 1 satisfied the W1−(W2−W3/2) value ranging from 20 to 65 when the wavelength W1 at which the near-infrared reflection layer had a transmittance of 50% to the light incident on the optical filter in the vertical direction was in a range of 670 to 750 nm, and the optical filter of Preparative Example 2 satisfied the W1−(W2−W3/2) value ranging from 20 to 65 when the wavelength W1 at which the near-infrared reflection layer had a transmittance of 50% was in a range of 700 to 730 nm.

Also, it was revealed that the optical filter of Preparative Example had a maximum transmittance (% $T_{NIR\text{-}peak}$) of 10% or less in the wavelength range of the near-infrared region (700 to 750 nm) when the wavelength W1 at which the near-infrared reflection layer had a transmittance of 50% with respect to the light incident on the optical filter in the vertical direction was less than or equal to 690 nm, and the optical filter of Preparative Example 2 had a maximum transmittance (% $T_{NIR\text{-}peak}$) of 10% or less in the wavelength range of the near-infrared region (700 to 750 nm) when the wavelength W1 at which the near-infrared reflection layer had a transmittance of 50% was less than or equal to 710 nm.

(2-2) Formation of an Absorption Layer Having a Thickness of 11 μm (W3=71 nm)

TABLE 3

|  | Preparative Example 1 | | Preparative Example 6 | |
| --- | --- | --- | --- | --- |
| W1 (nm) | W1 − (W2 − W3/2) | % $T_{NIR\text{-}peak}$ | W1 − (W2 − W3/2) | % $T_{NIR\text{-}peak}$ |
| 650 | 5 | 0% | −15 | 0% |
| 660 | 15 | 1% | −5 | 0% |
| 670 | 25 | 1% | 5 | 1% |
| 680 | 35 | 1% | 15 | 0% |
| 690 | 46 | 3% | 26 | 1% |
| 700 | 55 | 13% | 35 | 1% |
| 710 | 65 | 39% | 45 | 3% |
| 720 | 76 | 68% | 56 | 13% |
| 730 | 85 | 84% | 65 | 39% |
| 740 | 96 | 91% | 76 | 68% |
| 750 | 105 | 94% | 85 | 84% |

Referring to Table 3, it was revealed that the optical filter of Preparative Example 1 satisfied the W1−(W2−W3/2) value ranging from 0 to 50 when the wavelength W1 at which the near-infrared reflection layer had a transmittance of 50% was in a range of 650 to 690 nm, and the optical filter of Preparative Example 2 satisfied the W1−(W2−W3/2) value ranging from 0 to 50 when the wavelength W1 at which the near-infrared reflection layer had a transmittance of 50% was in a range of 670 to 710 nm.

Also, it was revealed that the optical filter of Preparative Example 1 had a % $T_{NIR\text{-}peak}$ value of 10% or less when the wavelength W1 at which the near-infrared reflection layer had a transmittance of 50% was less than or equal to 690 nm, and the optical filter of Preparative Example 2 had a % $T_{NIR\text{-}peak}$ value of 10% or less when the wavelength W1 at which the near-infrared reflection layer had a transmittance of 50% with respect to the light incident on the optical filter in the vertical direction was less than or equal to 710 nm.

(2-3) Formation of an Absorption Layer Having a Thickness of 15 μm (W3=83 nm)

TABLE 4

|  | Preparative Example 1 | | Preparative Example 6 | |
| --- | --- | --- | --- | --- |
| W1 (nm) | W1 − (W2 − W3/2) | % $T_{NIR\text{-}peak}$ | W1 − (W2 − W3/2) | % $T_{NIR\text{-}peak}$ |
| 650 | 12 | 0% | −8 | 0% |
| 660 | 21 | 1% | 1 | 0% |
| 670 | 32 | 1% | 12 | 1% |
| 680 | 41 | 1% | 21 | 0% |
| 690 | 52 | 2% | 32 | 1% |
| 700 | 62 | 9% | 42 | 1% |
| 710 | 71 | 32% | 51 | 2% |
| 720 | 82 | 63% | 62 | 10% |
| 730 | 91 | 80% | 71 | 32% |
| 740 | 102 | 89% | 82 | 63% |
| 750 | 112 | 93% | 92 | 80% |

Referring to Table 4, it was revealed that the optical filter of Preparative Example 1 satisfied the W1−(W2−W3/2) value ranging from 0 to 50 when the wavelength W1 at which the near-infrared reflection layer had a transmittance of 50% with respect to the light incident on the optical filter in the vertical direction was in a range of 650 to 680 nm, and the optical filter of Preparative Example 2 satisfied the W1−(W2−W3/2) value ranging from 0 to 50 when the wavelength W1 at which the near-infrared reflection layer had a transmittance of 50% with respect to the light incident on the optical filter in the vertical direction was in a range of 660 to 700 nm.

Also, it was revealed that the optical filter of Preparative Example 1 had a % $T_{NIR\text{-}peak}$ value of 10% or less when the wavelength W1 at which the near-infrared reflection layer had a transmittance of 50% incident on the optical filter in the vertical direction was less than or equal to 700 nm, and the optical filter of Preparative Example 2 had a % $T_{NIR\text{-}peak}$ value of 10% or less when the wavelength W1 at which the near-infrared reflection layer had a transmittance of 50% with respect to the light incident on the optical filter in the vertical direction was less than or equal to 720 nm.

What is claimed is:
1. An optical filter for blocking near infrared, comprising:
   a light absorption layer having a binder resin and a light absorbing agent dispersed in the binder resin,
   a near infrared reflection layer formed of multilayered dielectric films that include a dispersed light absorbing agent; and a glass substrate disposed between the near infrared reflection layer and the light absorption layer and directly contacting the near infrared reflection layer and the light absorption layer, wherein the optical filter satisfies the following Mathematical Formulas 1, 2 and 4:

$$\Delta E^* = \sqrt{(\Delta L^*)^2 + (\Delta a^*)^2 + (\Delta b^*)^2}$$ [Mathematical Formula 1]

wherein ΔE* is a difference in a color coordinate (L1*, a1*, b1*) for color E1 and a color coordinate (L2*, a2*, b2*) for color E2 and represents the color difference between light (E1) that is incident on the optical filter in a vertical direction and passes through the optical filter, and light (E2) that is incident at an angle of 30° with respect to the vertical direction of the optical filter and passes through the optical filter, and the ΔE* value is less than or equal 1.5, so that the color difference is hardly recognized by human eyesight, $$W2 - W1 < 20 \text{ nm}$$ [Mathematical Formula 2]

wherein W1 represents a wavelength at which the near-infrared reflection layer has a transmittance of 50% with respect to the light incident on the optical filter in the vertical direction in a wavelength range of 600 to 800 nm, and W2 represents a wavelength at which the light absorption layer has an absorption maximum, and $$\% T_{NIR\text{-}peak} < 10\%$$ [Mathematical Formula 4]

wherein % $T_{NIR\text{-}peak}$ represents a maximum transmittance in a wavelength range of 700 to 750 nm, and % $T_{NIR\text{-}peak}$ of 0% means none of the near infrared region wavelength transmits the optical filter and % $T_{NIR\text{-}peak}$ of 100% means all of the near infrared wavelength transmit the optical filter.

2. The optical filter of claim 1, wherein the optical filter satisfies the following Mathematical Formula 3:

$$0 \text{ nm} < W1 - (W2 - W3/2) < 65 \text{ nm}$$ [Mathematical Formula 3]

wherein W1 represents a wavelength at which the near-infrared reflection layer has a transmittance of 50% with respect to light incident on the optical filter in the vertical direction in a range of wavelength range of 600 to 800 nm, W2 represents a wavelength at which the light absorption layer has an absorption maximum, and W3 represents an absolute value of a difference between two wavelength values at which the light absorption layer has a transmittance of 50% in a wavelength range of 600 nm or more.

3. The optical filter of claim 1, wherein the glass substrate comprises a transparent glass substrate or a transparent resin-based substrate.

4. An imaging device comprising the optical filter according to claim 1.

5. The optical filter of claim 1, wherein the light absorption layer having a maximum absorption of one of 670 nm and 700 nm, a near infrared reflection layer having a transmittance of 50% with respect to a wavelength between 650 and 750 nm, and the optical filter has a difference of less than 15 nm in wavelength between light at which the light absorption layer has a transmittance of 30% of the light in incident on the optical filter in the vertical direction and passes through the optical filter, and light incident to at an angle of 30° of the vertical direction of the optical filter and passes through the optical filter.

6. The optical filter of claim 5, wherein the light absorption layer has a thickness of one of 7 μm, 11 μm, and 15 μm.

7. The optical filter of claim 1, wherein the multilayered dielectric films include an alternate stacking structure with first and second dielectric films.

8. The optical filter of claim 7, wherein the first and second dielectric films have first and second refractive indices in a range of 1.6 to 2.4 and 1.3 to 1.6, respectively.

9. The optical filter of claim 7, wherein the first and second dielectric films are alternatively stacked one of 5 to 61 times, 11 to 51 times and 21 to 41 times.

* * * * *